United States Patent
Goddard

(12) 
(10) Patent No.: US 6,876,983 B1
(45) Date of Patent: Apr. 5, 2005

(54) SYSTEM AND METHOD FOR FACILITATING AGGREGATE SHOPPING

(76) Inventor: Opher Goddard, 16 Melchet Street, Tel Aviv, 65234 (IL)

(*) Notice: Subject to any disclaimer, the term of this patent is extended or adjusted under 35 U.S.C. 154(b) by 0 days.

(21) Appl. No.: 09/487,719

(22) Filed: Jan. 19, 2000

Related U.S. Application Data

(60) Provisional application No. 60/110,597, filed on Dec. 2, 1998.

(51) Int. Cl.$^7$ .............................................. G06F 17/60
(52) U.S. Cl. ............................ 705/37; 705/26; 705/27
(58) Field of Search .............................. 705/26, 27, 37

(56) References Cited

U.S. PATENT DOCUMENTS

| | | | | |
|---|---|---|---|---|
| 5,794,219 A | * | 8/1998 | Brown ........................ | 705/37 |
| 5,878,400 A | * | 3/1999 | Carter, III .................... | 705/20 |
| 6,260,024 B1 | * | 7/2001 | Shkedy ........................ | 705/37 |
| 6,269,343 B1 | * | 7/2001 | Pallakoff ..................... | 705/26 |
| 6,418,415 B1 | * | 7/2002 | Walker et al. ................ | 705/26 |

FOREIGN PATENT DOCUMENTS

JP 01276270 A * 11/1989

OTHER PUBLICATIONS

Avery, Susan; "Delta pools phone buy—with a twist"; Purchasing, Boston: Jul. 16, 1998; vol. 125, Iss. 1, p. 189, 3 pages.*

* cited by examiner

Primary Examiner—James S. McClellan
(74) Attorney, Agent, or Firm—G. E. Ehrlich (1995) Ltd.

(57) ABSTRACT

A system for facilitating aggregate shopping is disclosed. The system comprises (a) a database server system being for maintaining at least one shoppers group, the at least one shoppers group being characterized by a designated product and conditions for purchasing the designated product; and (b) a plurality of user clients, being at a disposal of a plurality of users and being capable of communicating with the database server system, each of the plurality of user clients being for enabling a respective user thereof to join the at least one shoppers group, such that a user of the plurality of users is entitled to purchase the designated product under the conditions for purchasing the designated product upon joining the at least one shoppers group.

12 Claims, 3 Drawing Sheets

SYSTEM AND METHOD FOR FACILITATING AGGREGATE SHOPPING

This application claims benefit of 60/110,597 filed Dec. 2, 1998.

FIELD AND BACKGROUND OF THE INVENTION

The present invention relates to a system and method for facilitating electronic aggregate shopping and, more particularly, to a system which enables shoppers to set up or join shopping groups determined by a product desired thereby.

Shopping via electronic communication networks, especially the Internet, is fast becoming common practice among present day shoppers.

The Internet is considered the preferred new marketplace for a variety of products including goods and services. Using the Internet to conduct shopping affords buyers with numerous advantages. A shopper conducting transactions through the Internet can shop at any time during the day while enjoying the convenience of shopping from home or the office. In addition, since a shopper can readily access product information including pricing of a product sold by numerous retailers, price comparison can easily be effected for this product.

The proliferation of Internet mediated retail shopping has brought about the development of software shopping agents, commonly referred to as "smart agents". These software programs or modules are capable of self browsing the Internet and completing tasks according to a command provided by a user, thus enabling a user to receive information on a best price or selling terms of a specific product easily and rapidly. As such, these smart agents free the user from the tedious task of browsing through numerous electronic product catalogues.

Although Internet mediated shopping has proliferated tremendously during the past few years, several shopper advantages which can be provided through the use of this medium are yet to be exploited.

The Internet is a virtual community or collection of virtual communities of users which are inter linkable therebetween. For example, Internet chat groups of a specific subject matter gather a distinct and sometime geographically dislocated group of people sharing a common interest, which interest is embodied by the subject matter of this chat group. Thus, the Internet enables this group of people which share a common interest to intercommunicate, a situation which, in the absents of the Internet, could not be readily realized.

This unique quality of the Internet can be utilized to gather shoppers wishing to purchase a designated product into aggregate shopping groups.

Aggregate shopping provides shoppers with leverage against retailers. The buying power of a group of people enables to maneuver a retailer to a price point lower than or sale terms improved as compared to that offered to a single shopper, thus providing considerable savings and/or other advantages to the shoppers of this group.

Thus, the present invention is of a system and method for facilitating aggregate shopping, by enabling shoppers to set up or join shopping groups which are determined according to a product they wish to purchase or to a product offered thereto.

SUMMARY OF THE INVENTION

According to the present invention, there is provided a system for facilitating aggregate purchasing of products, in the form of designated goods or services, the system comprising:

a plurality of user client devices for use by potential purchasers of said products;

a plurality of supplier client devices for use by potential sellers of said products; and a database server system communicating with said plurality of user client devices and said plurality of supplier client devices; said database server system being designed and programmed:

(a) to maintain a catalog of products identifying each and to make said catalog available to potential purchasers via their respective client devices;

(b) to enable potential purchasers to use their respective user client devices to become members of at least one purchasers group of potential purchasers of designated products by assuming an obligation to purchase a said product at a price no higher than a specified maximum price;

(c) to formulate a bid request for a designated quantity of a designated product for purchase by said purchasers group at a price no higher than the respective maximum price;

(d) to present said bid request to a plurality of potential sellers via their respective supplier client devices;

(e) to enable potential sellers to use their respective supplier client devices to tender offers regarding purchase conditions for the sale of the designated quantity of the designated product in the formulated bid request;

(f) to determine the best selling conditions offered by said sellers; and (g) to make an award to the potential seller offering the best selling conditions for the sale of the designated quantity of the designated product.

According to features in the described preferred embodiment, the award is made to the potential seller offering the lowest selling price for the sale of the designated quantity of the designated product.

According to further features in the described preferred embodiments, the designated product may be a specifically identified good or service, or one of several specifically identified goods or services. The designated product may also be identified by a specification.

It may also be an option for a specifically identified good or service, or may be a group of specifically identified goods or services bundled together as a single product package.

According to still further features in the described preferred embodiment, the database server system is programmed to enable potential purchasers to use their respective user client devices within a specified time period to become members of a said purchasers group, or to enable potential sellers to use their respective supplier client devices within a specified time period to tender a said offer.

According to still further features in the embodiment of the invention described below, the database server system is programmed to enable a plurality of potential sellers to use their respective supplier client devices to tender joint bids regarding the designated quantity of the designated product in a formulated bid request, or to enable a plurality of groups of purchasers to use their respective user client devices to become members of any one of a plurality of said purchasers groups.

The present invention successfully addresses the shortcomings of the presently known configurations by providing system and method which enable users thereof to enjoy the benefits afforded by aggregate shopping, while enabling suppliers to substantially increase sales of products.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
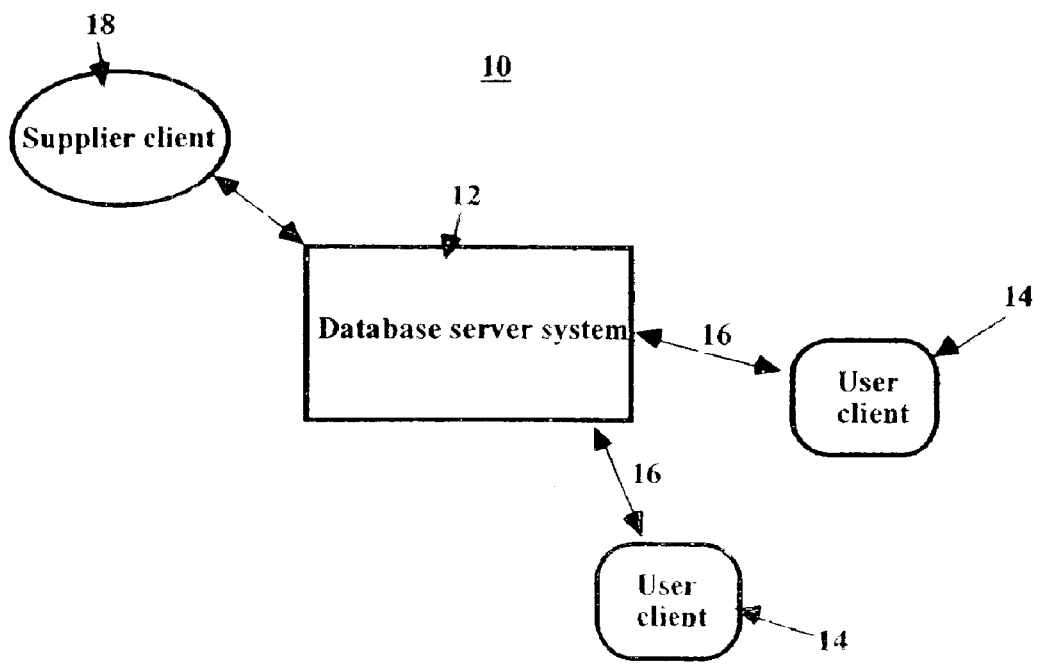
FIG. 1 is a black box diagram of the system for facilitating aggregate shopping according to the present invention.

The present invention is of a system and method which can be utilized to facilitate aggregate shopping of products on-line. Specifically, the present invention can be used to provide users with the ability to set up or join shoppers groups each characterized by a designated product and conditions of purchase of the designated product.

The principles and operation of a system and method for facilitating aggregate shopping according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates the system of the present invention which is referred to herein as system 10. System 10 is designed for facilitating aggregate purchasing of products in the form of designated goods or services. It comprises: a plurality of user client devices 14 for use by potential purchasers of the products; a plurality of supplier client devices 18 for use by potential sellers of the products; and a database server system 12 communicating with the plurality of user client devices 14 and the plurality of supplier client devices 18. As will be described more particularly below, the data server system 12 is designed and programmed (a) to maintain a catalog of products, and to make said catalog available to potential purchasers via their respective client devices;

(b) to enable potential purchasers to use their respective user client devices to become members of at least one purchasers group of potential purchasers of designated products by assuming an obligation to purchase a said product at a price no higher than a specified maximum price;

(c) to formulate a bid request for a designated quantity of a designated product for purchase by said purchasers group at a price no higher than the specified maximum price;

(d) to present said bid request to a plurality of potential sellers via their respective supplier client devices;

(e) to enable potential sellers to use their respective supplier client devices to tender offers regarding purchase conditions for the sale of the designated quantity of the designated product in the formulated bid request;

(f) to determine the best selling conditions offered by said potential sellers; and (g) to make an award to the potential seller offering the best selling conditions for the sale of the designated quantity of the designated product.

In the description below, the user client devices 14 are sometimes referred to as "user clients"; the supplier client devices 18 are sometimes referred to as "supplier clients"; and the purchasers groups are sometimes referred to as "shoppers groups".

System 10 includes a database server system 12 which serves for maintaining at least one shoppers group. Preferably a shoppers group is maintained by database 12 for a predetermined time period, which can range from minutes to days and even weeks, during which time the shoppers group is considered active and can be joined by new members. Optionally, joined members can also remove themselves from an active shoppers group throughout the predetermined time period. The shoppers group is characterized by a designated product and conditions for purchasing the designated product. Thus, a plurality of shopper groups can be co-maintained by database 12, wherein each shoppers group is characterized by a specific designated product and conditions for purchasing this designated product.

In addition, each shoppers group can further be characterized by for example, geographic location of its members (e.g. shopper groups including members of a specific country, region or other) and other characteristics other than a designated product which may be used to differentiate between various groups.

The information characterizing each shoppers group and information which pertains to members thereof, such as personal profile information and the like is stored within database 12. It will be appreciated that at least a portion of this information is also providable to users of system 10, as further described hereinbelow, such information can be, for example, information pertaining to the designated product, conditions of purchase and the number of shoppers that have already joined a shoppers group at any given time.

System 10 further includes a plurality of user clients 14 (two are shown). Each specific user client 14, is at a disposal of a user. User client 14 is capable of communicating with database server system 12 via for example, a dialup connection or a local area network as indicated by 16.

User client 14 enables a respective user thereof to join a shoppers group by simply establishing communication with database 12 and by commanding database 12 to include the user in any active shoppers group of choice. It will be appreciated in this case that since joining a shoppers group entitles a user with future benefits, a user identification process is effected such that only users which are registered with system 10 can access and join a shoppers group.

It will further be appreciated that a user can also be a business entity which, in a sense, can function as an individual within a shoppers group. As such "a shopper" or "a user" as used herein, can refer to an individual or a business entity.

Figure 2:
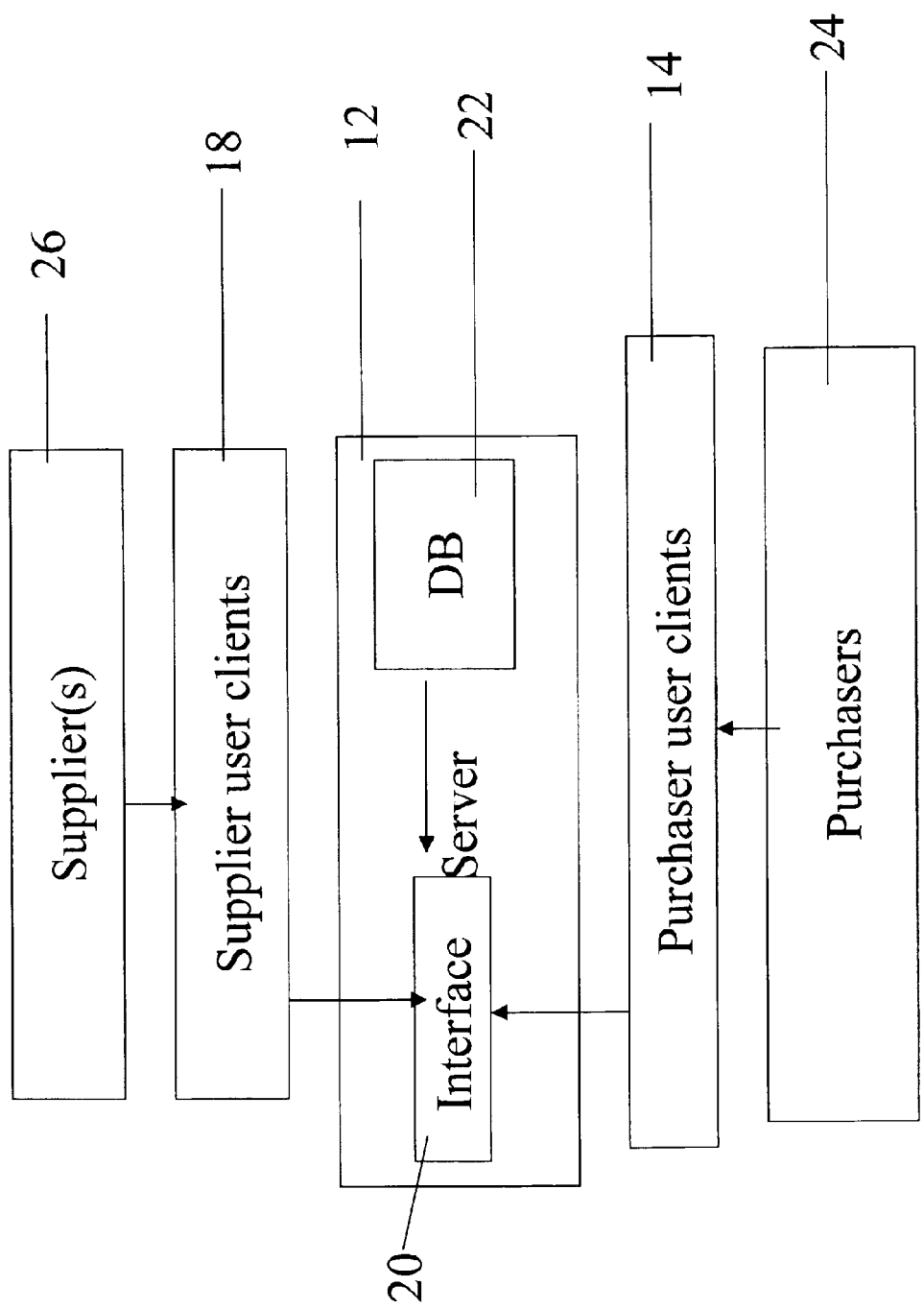
FIG. 2 is a black box diagram showing in greater detail the system of the present embodiments located between purchasers and suppliers.

Reference is now made to FIG. 2, which is a simplified black box diagram illustrating in greater detail the system of the present embodiments as located between suppliers and purchasers. Parts that are the same as in previous figures are given the same reference numerals and are not described again except to the extent necessary for an understanding of the present figure. Database server system 12 provides an interface 20 between supplier clients 18 and user clients 14. The interface is supported by a database 22 which will be described in greater detail below. Purchasers 24 and suppliers 26 interact with each other according to the various embodiments described herein via the interface 20.

Figure 3:
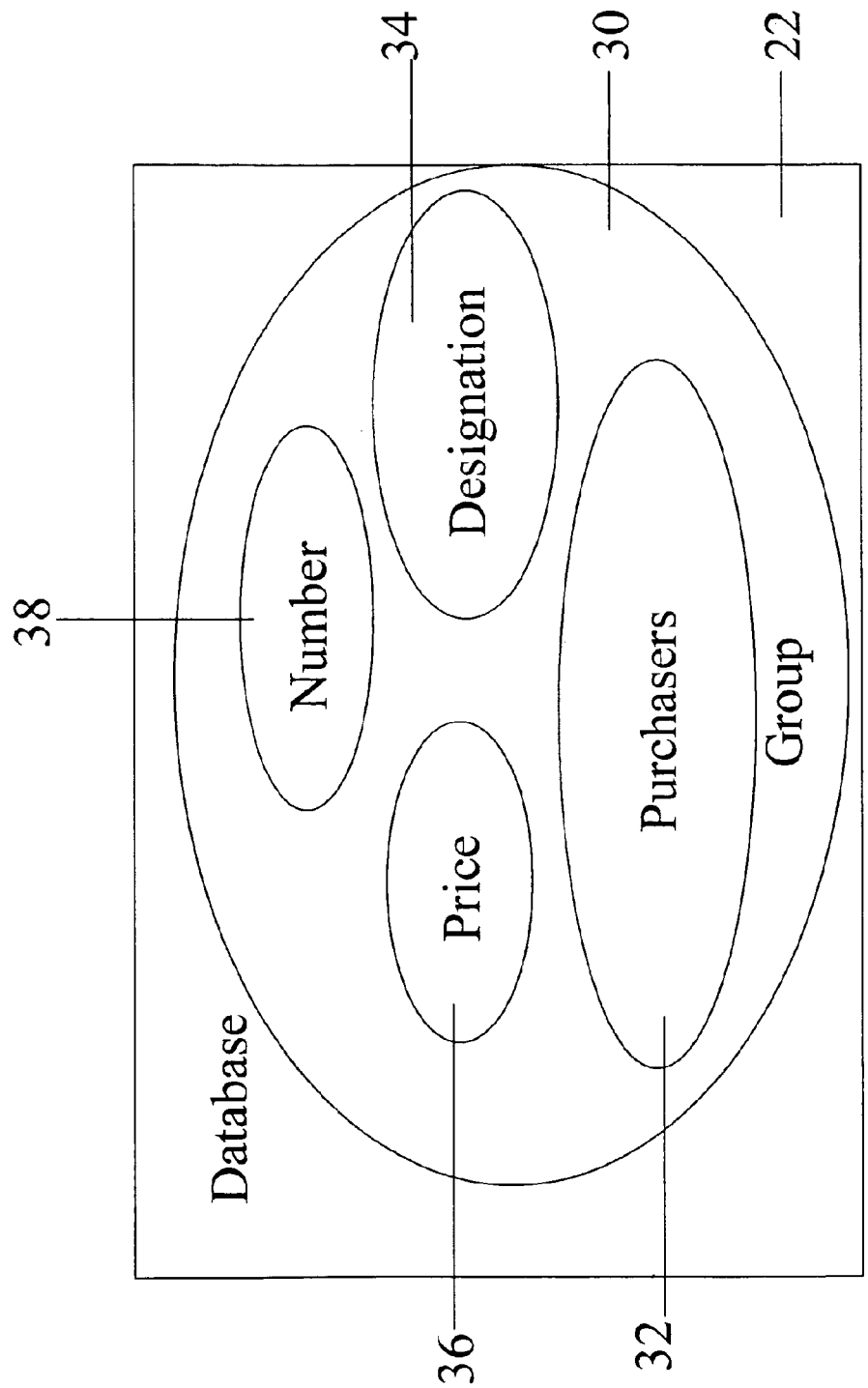
FIG. 3 is a black box diagram illustrating a preferred structure for the database of FIG. 2.

Reference is now made to FIG. 3, which is a simplified illustration showing a preferred configuration of database 22 for supporting interface 20 during the course of trading activity. The database 22 forms a group 30 of the parties and products involved in the given activity. The group 30 typically includes the purchasers involved 32, the product designations 34 or combinations of products and their designations or specifications defining products or manufacturers and the like, price information 36, and information about other relevant numbers 38. The relevant numbers may for example be numbers of users required to trigger the trade, numbers required to reduce a price, numbers of products, times relevant to the trade and the like.

Once becoming a member of a shoppers group, a user is entitled to purchase the designated product designating the shoppers group under conditions described therein. It will be appreciated, as has already mentioned hereinabove, that a user can also leave a shoppers group at any time during the predetermined time period.

Preferably, a user is entitled to purchase the product only following termination of the predetermined time period following which the shoppers group is considered inactive and thus no longer open to joining or leaving.

It will be appreciated, that conditions of purchase may change at any time during, or following the predetermined time period, which change may be a function of the number of members in a shoppers group and the quantity of the product demanded thereby. For example, if a certain price is set for a designated product of a group, which price applies with a condition that the group includes no less than, for example, 100 members, than in case where this group includes at the end of the predetermined time period less than 100 members the price set for the designated product can increase or alternatively the ability of this group to aggregate shop may be forfeited.

As used herein he term "product" refers to either goods or to services rendered. A product can be defined as a specific product such as, for example, a television set produced by a specific manufacturer, and as such defined by a catalog number, a year of manufacturing and the like, or in the case of a service, a specific service is a service rendered by a specific provider.

Alternatively, a product can be defined by a specification, which details the type of product, but not the manufacturer, or which details the type of product and a list of optional manufacturers. A product is defined by a specification when the manufacturer (brand name) is of less importance to the shopper. Such is the case with, for example, bulk quantities of A4 paper, pencils etc., or even a PC computer, where a specification (e.g., size of hard drive processor speed and the like) can define the product the shopper desires to buy is typically more important to the shopper than a brand name.

In the case of services, a service characterized by a specification is a service which is not unique to a single service provider. For example, a savings or insurance plan can be characterized by a specification since the terms of the plan and/or the annual yield can define the product the shopper desires to buy are more important to a shopper than the service provider name.

It will be appreciated that a specification can also include a choice of manufacturers. As such, a product offered can further be characterized by a group of manufacturers, such that the shopper is guaranteed that the product purchased thereby is supplied from one of the manufacturers listed (for example, a 20" color television manufactured by Sony, Phillips or Sanyo, etc.). A specification further characterized by a group of manufacturers is preferred in cases where the brand name or name of the service provider is important to the shopper.

It will be appreciated that shoppers groups characterized by specification type products are inherently advantageous because in this case such a product can be acquired from a plurality of competing suppliers and therefore these suppliers are more amenable to price negotiations.

A product according to the present invention can also refer to an option of purchasing a product. In this case, the user purchases an option at a price well below that of the product to which the option pertains, which option entitles the user to receive the product sometime in the future. Since such options are of a set value and since they enable holders thereof to purchase a product at a reduced aggregate shopping price, a user holding such an option may trade, sell or be entitled to a refund, according to the value of the option.

As further detailed hereinunder, the product purchasable by users of system 10 which are members of a shoppers group is typically supplied by a supplier 18 which forms a part of system 10. As further detailed herein, such suppliers may be under contract with an operator of system 10, or alternatively contacted by the operator to supply products at agreed upon conditions of purchase. Alternatively, and as is further detailed hereinunder, suppliers may also establish shoppers groups utilizing system 10 of the present invention.

As used herein in the specification and in the claims section that follows, the phrase "user client" includes, but is not limited to, personal computers (PC) having an operating system such as DOS, Windows™, OS/2™ or Linux™; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™, Nokia Communicator™ or any other handheld device; or any other known and available operating system. The term further includes mobile cellular telephone devices and mobile cellular communicator devices having, in addition to telephone properties, capabilities similar to those of a personal computer (PC) or a personal digital assistant (PDA).

Hereinafter, the term "Windows™" includes but is not limited to Windows95™, Windows 3.x™ in which "x" is an integer such as "1", Windows NT™, Windows98™, Windows2000™, Windows CE™ and any upgraded versions of these operating systems by Microsoft Inc. (Seattle, Wash., USA).

According to another preferred embodiment of the present invention client 14 is a personal computer operating a web browser program., such as, for example, Netscape Communicator™, Internet Explorer™, Opera™, iCab™, Mosaic™, and the like, in which case database 12 communicates with the World Wide Web and information pertaining to shoppers group is preferably included in a web site which is accessible to users via their user client.

According to another preferred embodiment of the present invention user client 14 is a television set operating a web browser program (i.e., Web-TV).

By using a web browser program, a user of system 10 can interactively access the information provided by database 12 via a web site, and also communicate information to database 12 via the web site. It will be appreciated that such two way communication between database 12 and a user operated web browser via a web site can be, for example, provided through common gateway interface (CGI).

Using CGI scripts the information included within database 12 can be ported to the World Wide Web via a web site interface in a manner which allows users to dynamically interact with the information. The utilization of CGI scripts for such purposes is well known in the art of computers and as such no further detail is included herein.

According to another preferred embodiment of the present invention user client 14 is a personal computer operating a dedicated software program which is designed to specifically communicate and exchange information with database 12.

According to the teachings of the present invention, a shoppers group maintained by database 12 can be established by one of several methods.

According to one preferred embodiment of the present invention the shoppers group is established by a user of system 10, which shoppers group, is maintained by database server system 12 as described hereinabove. In such a case, the user defines the designated product and the conditions of purchase. It will be appreciated in this case that the defined product and conditions of purchase are so defined such that the chances of obtaining the product from a supplier are reasonably high.

As already mentioned hereinabove, an aggregate purchasing power rendered to such shoppers groups is also a function of the type of product characterizing the shoppers group. For example, in the case where a shoppers group is designated by a specification type product, the operator of system 10 can better negotiate for a price or force a supplier to commit to a price designated in the conditions of purchase characterizing this shoppers group since this product is available from a plurality of suppliers.

To ensure that users do not establish shopper groups which are characterized by a product and/or conditions of purchase which are not within reason, system 10 can monitor these groups so as to notify such users of unreasonable product and/or conditions of purchase information provided thereby. To this end, system 10 stores and catalogues information from various suppliers, such that information pertaining to product prices and conditions of purchase accumulated therein can be used to cross reference user provided information.

Alternatively a user can establish a shoppers group for a product which is listed by a catalogue provided by database 12. In this case, an appropriate price range for the product is provided by database 12.

According to another preferred embodiment of the present invention, the shoppers group is established by database server system 12. In this case an operator of system 10 can establish any number of shopper groups, each characterized as further described hereinabove.

It will be appreciated in this case that designated products and conditions of purchase which characterize each shoppers group can be selected by the operator of system 10 according to parameters effected by product popularity and or availability from suppliers, in which case, once a shoppers group is established and users join up the operator can negotiate with a supplier or suppliers for the best price and/or other purchase conditions.

Alternatively and preferably the operator may sign an agreement with a supplier or suppliers which requires the supplier(s) to commit to a price, which price can be, for example, a function of a preset number of members of a shoppers group. In this case, database 12 maintains a catalogue of products available from suppliers, which products are used to establish groups according to the operator's discretion.

According to another preferred embodiment of the present invention, the shoppers group is established by a supplier. To establish a shoppers group a supplier may be provided with a supplier client 18 which is similar in function to user client 14.

Alternatively, a supplier can establish a shoppers group by simply providing operator of system 10 with appropriate information via facsimile, telephony or electronic mail.

It will be appreciated that this configuration of system 10 is advantageous since it essentially links suppliers and shoppers while providing shoppers with the benefits gained from aggregate shopping and providing suppliers with the ability to greatly increase their market share. In addition, since in this configuration an operator of system 10 functions in linking supply and demand, such an operator is freed from the need to approach or to contract specific suppliers.

System 10 of the present invention preferably simultaneously implements all three shoppers group establishment configurations described hereinabove.

As such, system 10 of the present invention enables an operator thereof to cross reference between supplier established groups and user established groups so as to optimally match between supply and demand. For example, members of a shoppers group designated by a specific product can be alerted by system 10 of a supplier group which is offering an identical or a similar product. In this case system 10 can provide members with details of the product offered by the supplier so as to enable these members, in cases where it is advantageous thereto, to abandon their shoppers group and join the supplier group. This process can be done automatically by the system in cases where the user has agreed in advance or upon request for such an action.

Thus the present invention, enables shoppers to enjoy the benefits provided by aggregate shopping while enabling suppliers to dramatically increase their sales. In addition since the present invention accumulates shopper demands, additional benefits may be realized by for example pooling product demands of several shopper groups into a single supplier demand thus increasing a demand volume presented to a single supplier and therefore further increase shopper savings.

It will be appreciated that in the case where a shopper is a business entity, system 10 of the present invention can serve as a forum for business to business transactions.

Finally, since the system of the present invention processes shopper demands statistical data on the popularity of products and the shopping habits of individual shoppers can be generated.

For example statistical data pertaining to the demand for particular items can be forwarded by the system of the present invention to suppliers. This information can assist suppliers in better planning inventories. In addition the shopping habits of shoppers can be tracked so as to yield a shopping profile for each shopper. Statistical information generated can then include, for example, products most preferred by a shopper and the like. It will be appreciated that the shopping profile information of a shopper can be used to notify such a shopper of upcoming establishment of shopper groups of interest. Furthermore, statistical data compiled and extracted from the shopping profiles of numerous shoppers can be used to provide products which are in demand by the users.

Additional objects, advantages, and novel features of the present invention will become apparent to one ordinarily skilled in the art upon examination of the following example, which is not intended to be limiting. Additionally, each of the various embodiments and aspects of the present invention as delineated hereinabove and as claimed in the claims section below finds support in the following example.

EXAMPLE

Reference is now made to the following example, which together with the above descriptions, illustrate the invention in a non limiting fashion.

General Background

The general idea underlying the present invention is the recognition that the tremendous developments in the computer and communications technologies are being utilized in a very limited scope in commerce in general and in sales and marketing of consumer goods in particular, especially in enabling shoppers to enjoy the advantages afforded by aggregate shopping of products. Incorporation of electronic communication technologies into retail shopping should significantly change and expand the retail process as it is known today.

General Description of the Invention

The system of the present invention combines hardware and software to create an environment for shoppers and suppliers in which the benefits of aggregate shopping are realized for both shoppers and suppliers. The system of the present invention stores and analyses input from both shoppers and/or suppliers, and functions to match between the supply and demand factors (best matching).

The ability of the system to analyze and match inputted data in real time creates a distinct advantage in this case. By enabling users to establish or join a shoppers group in real-time it essentially amasses a group of people which share nothing in common other than the interest in a specific product.

The system of the present invention accumulates demands for a specific product from a group of shoppers to thereby provide each shopper with advantages inherent to aggregated shopping. Demand means the offer by potential shoppers to purchase a designated product at defined purchase conditions (price, availability, terms of payment and the like). Since the system of the present invention system forms a shopper groups, it enables the shopper members thereof to obtain better purchasing conditions from suppliers. Thus, the system of the present invention gathers individual shoppers into groups thus providing them with "bargaining power" while allowing each individual to enjoy the benefits of the group. In addition, since the system of the present invention can co-maintain a plurality of shoppers groups, accumulation of demand from several groups can further increase the buying power of shoppers.

The system will also enable suppliers to make offers suited for large volume buying thus making it possible for the suppliers to sell with a lower profit margin per item.

TAD and Combining Demands

The system of the present invention also creates a new data entity referred to herein as Total Accumulated Demand (TAD).

For example, when dealing with a single supplier the system of the present invention can combine all the individual demands of shoppers of various shoppers group at a given moment into one unified offer. The unification of demands can be effected in several ways, thus TAD will enable the system of the present invention to generate different supply and demand statistics.

For example—if the TAD includes 20 VCRs Model X. 50 VCRs model Y, 30 TV sets model Z, then an electronic appliance supplier which is either under contract with the operator of the system of the present invention or is approached by the operator is presented with a total accumulated demand of 100 electrical appliances.

The demands of various shopper groups can be organized into various TAD combinations which can be presented to various suppliers in order to maximize savings. In addition suppliers presented with TADs will be able to plan and target their product offers so as to accommodate this specific demand architecture.

Information Provided by the System

For the system of the present invention to function properly at least two things should be defined and agreed upon. The product designated should be defined and a set of rules and a commercial agreement to which both the shoppers and the suppliers should agree to and act in accordance with must be drafted.

It is necessary to describe the product in a clear and definitive manner in order to optimize the operation of the system of the present invention. A product which is not described accurately is not likely to be readily purchased by present day consumers. Presently, suppliers advertise (through electronic communication mediums) different products under different descriptions and names even though in many cases the product sold by the various suppliers is identical. The lack of a universal description prevents "smart agents" from performing their searches in an efficient and rapid manner.

The system of the present invention will present users with a catalogue which will list all the goods and services available for sale. The description and data will be in standard form (prearranged). The information will be available in text and, to the extent possible, in graphic form (such as pictures, graphs, video etc.). The goods/services can be divided into three levels and with every item included in one or more categories. The specifications of the products will rely primarily on the data given by the manufacturer of the product.

The system may also provide additional information on products, which information will be generated by the operator of the system and will include unbiased information on the product. In addition, users may be urged to contribute reviews of products purchased thereby.

The system will enable users to access catalog and any additional information through either menu browsing or through keyword search.

The Agreement

The agreement includes a group of terms and conditions under which the system will operate. These terms will define the relations between the buyers/shoppers and the sellers/suppliers and the obligations the two sides take upon themselves when entering into the agreement. The agreement will also define the role of the system as an intermediary between the two sides.

The agreement will explain in general terms the commercial principles of the system and the standards and criteria's according to which it operates. It will be appreciated that a user wishing to join or setup a shoppers group will need to submit personal profile information, such as mode of payment and will need to confirm that they have read the agreement and the specific rules of the group and that they agree to the terms and conditions of the agreement and the group.

Transactions

There are four main processes governing aggregated purchasing of products via the system of the present invention, the reversed tender, the on-line tender, sellers mode and a tender for a one of a group of products or a tender for a product defined by a specification.

The Reversed Tender:

As the name indicates—it is a tender where the suppliers bid to answer the overall demand, and the winner is the supplier which offers the best conditions of purchase. It will be appreciated that several suppliers can be combined to meet the demands of a single shoppers group, in which case, such suppliers conform to the conditions set by the group.

The system generates "virtual demand rooms" each corresponding to a shoppers group. In each and every "room" demand data for one specific defined product that appears in the catalogue is gathered.

Every "virtual demand room" will supply the following data: (i) the maximum price to be paid for the product offered in the room; (ii) the current and updated demand—the overall demand in the room at each point in time; (iii) the last date/time for submitting proposals by shoppers i.e. the last date/time for joining a shoppers room; (iv) the last date/time for submitting supplier bids; (v) the date/time of publishing the results of the tender and the winning supplier bids.

Every room, and as such every shoppers group will have its own set of rules which can vary according to the specific product.

The general terms and rules which apply to all shopper groups include—the final price will never exceed the prescribed maximum price; a shopper who joined a shoppers group must purchase the product if all the predefined conditions are fulfilled.

The system is not obligated to supply the product to all the members of the shoppers group. If for example 1000 demands were registered but only 900 items are available, then the first 900 users to join the group are entitled to purchase the products.

Customizing the Tender: The customizing process is a computerized process that will enable the system to allow suppliers to choose the goods and/or services that they wish to receive the TAD for. This process will simplify and narrow the number of requests sent to potential suppliers and will make sure that the suppliers in the system will receive the TAD relevant to the products and/or services they wish to sell.

Submission of Proposals: Each supplier who wishes to participate in bidding for a supplied product or TAD will first have to fill out a specific form. Prior to participation a supplier will have to agree to the general terms of the agreement and to the specific terms of the group in question. The proposal by the supplier can be for the supply of the entire or a part of the TAD (both for a specific product or a group of products).

Different Formats of Proposals: Suppliers will be able to choose from different formats of proposals. Various proposal formats will enable the suppliers to adjust their proposals accordingly.

The formats available to the suppliers can include for example, (i) proposal for a given number of products at a given price, for example—100 televisions model X at 70$ per unit; (ii) a "progressive" proposal (as shown in Table 1) whereby the price per unit is a function of the number of units.

TABLE 1

| | progressive proposals | |
| Product | Number of Units | Price Per Unit |
| --- | --- | --- |
| TV Model X | 1 | 70$ |
| TV Model X | 2–9 | 64$ |
| TV Model X | 10–50 | 55$ |

Other formats include: (iii) a progressive discount per unit wherein a maximum and minimum number of units is predetermined by the system and the supplier offers a discount per unit, for example: max. –100, min. 20, if the proposed price for 20 units is $65 per unit, the offer will state that for every additional 5 units the supplier will give a discount of 2% (translating into a 44.2$ per unit price for 100 units); (iv) a general proposal for a group of products—for example: 100 TVs model X and 50 VCRs model Y at $21,000. This proposal is for the "entire package" and is indivisible; (v) progressive discount as a function of the volume—for example, if the volume of the transaction will exceed $10,000 pre-discount, a 15% discount will be given.

At the last date/time for proposals the system will perform the "Best Match" process. This process enables to achieve the best matches for the demand and supply data stored by the system. In general terms, the system will grade the compatibility between the different proposals and the TAD and the proposal which receives the highest grade wins. It should be clarified that the proposal which is the winner may only cover portion of a TAD or demand for a single product from a single shoppers group. Thus, there may be additional winners for other portions TADs or groups.

Different considerations are weighed while evaluating and scoring proposals. The system will calculate not only the price, but other factors such as volume, terms of payment, reliability of the supplier etc. Determining the criteria and their weight will be a learned experience which will be fine tuned with.

The Closing of the Tender: After the evaluation and scoring process is completed, the transactions will take place and the shoppers and the suppliers will be informed of the results.

The On-Line Tender:

The on-line tender is an additional process of uniting demand and matching the TAD to a sophisticated supply evaluating mechanism (the "Best Match" logic). The concept of this process is that suppliers submit the quantities and prices before they receive the TAD. This process is different from the process described above (in the reversed tender) due to the fact that the suppliers make their offer before they know the TAD. From the shoppers perspective this tender guarantees a fixed price for a product for a given quantity of this product.

In order to make this process possible, the system must be able to evaluate the TAD at every given moment in order to run a comparison with the supply data provided. This evaluation process is necessary in order to cover demands, the system must make sure that it does not accept demands that can not be matched by proposed supplies.

For the system to be able to create compatibility between supply and demand, it must be able to evaluate the supply data at every given moment. The way to ensure the compatibility of supply and demand is by using the "Price List".

The Price List: The Price List enables suppliers to propose bids which can be evaluated on-line. A price list can apply to a single product, a price per unit for a range of quantities, a total price for a given quantity ($5,000 for 100 TVs, model X), a total price for a specific quantity of a group of products, a progressive discount per quantity or a progressive discount per volume of the deal.

The supplier must produce information regarding the total number of units of the product(s) carried in stock. This information is necessary for the evaluation of validity of the price list in regards to the supplier.

Sellers Mode:

In the sellers mode the suppliers are the initiators of the proposals, i.e. the suppliers establish the shoppers group. This mode is especially useful for suppliers who wish to sell large volumes of a product.

Thus a supplier may propose the following: a television set Model X at $40 a unit, conditional on a demand for 50 units until 16:00, today, etc.

A Tender for a One of a Group of Products or a Tender for a Product Defined by a Specification:

The logic behind this process is that in many cases a shopper knows the specification of the product he/she wants to purchase, but he is willing to buy one of a group of products which fulfill this desired specification. For example if a shopper wishes to purchase a color television set with a 20" screen the system will form an open tender which will be submitted to manufacturers or suppliers of televisions complying with this specification. These manufacturers can either be specified, in which case the shopper knows a head of time that the television is to be purchased from a manufacturer included within a group of manufacturers specified by either the system or the shopper, or alternatively manufacturers are not specified. The system will evaluate the offers and decide on the best offer in accordance with the specification of the group, following which the deal is finalized.

Hardware/Software Architecture

The system of the present invention operate as a hardware software system that will operate from a single computer or a Network of computers. A data base of an existing type will operate within the system (e.g., ORACLE SQL SERVER). The shoppers and suppliers will connect to the system through the Internet and/or any other communications modes available.

The software system will include several software modules as follows:

Communications with shoppers module: This module will enable the shoppers to browse the catalogue, to view the various supplier offers (sellers mode) and to join a shoppers group characterized by a specific demand. This module can also deliver the final results to the Shoppers.

Communications with suppliers module: This module will enable the suppliers to propose bids to the various shopper groups and to make proposals in the Sellers Mode. This module will also deliver the final results to the suppliers.

A module for configuration of the algorithm to resolve the "Best Match": This module will unify the demands of the various processes, the evaluation of the proposals, and the determination of the Best Matches.

In addition a software module for linking the data base to the other modules, a module for the management of the Price Lists and other system parameters and a module for maintenance and backup of the system will also be incorporated into the system of the present invention.

Several tables will be implemented by the database utilized by the system of the present invention.

A suppliers table: which includes general information about the suppliers registered in the system.

A catalogue table: which includes information about the products offered by the system.

A price list table: which includes information on the various prices offered by suppliers to some or all of the products of the catalogue.

A buyers table: which includes information on the shoppers or potential shoppers.

A demands table: which includes information about the various shopper groups and which will be linked to the buyers table.

A sellers mode table: which includes all the various sellers mode offers.

Thus the system of the present invention enables both shoppers and suppliers to enjoy the benefits provided by aggregate shopping of products, which benefits include enhanced purchasing conditions to the shopper and wide distribution and a large volume of sales to the supplier.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for facilitating aggregate purchasing of products, in the form of designated goods or services, the system comprising:

a plurality of user client devices for use by potential purchasers of said products;

a plurality of supplier client devices for use by potential sellers of said products; and a database server system communicating with said plurality of user client devices and said plurality of supplier client devices; said database server system being designed and programmed:

(a) to maintain a catalog of products, and to make said catalog available to potential purchasers via their respective client devices;

(b) to enable potential purchasers to use their respective user client devices to become members of at least one purchasers group of potential purchasers of designated products by assuming an obligation to purchase a said product at a price no higher than a specified maximum price said specified maximum price is set by said system;

(c) to formulate a bid request for a designated quantity of a designated product for purchase by said purchasers group at a price no higher than the specified maximum price only after said purchasing group has been finalized;

(d) to present said bid request to a plurality of potential sellers via their respective supplier client devices;

(e) to enable potential sellers to use their respective supplier client devices to tender offers regarding purchase conditions for the sale of the designated quantity of the designated product in the formulated bid request;

(f) to determine the best selling conditions offered by said potential sellers; and (g) to make an award to the potential seller offering the best selling conditions for the sale of the designated quantity of the designated product.

2. The system according to claim 1, wherein said database service system is programmed to make an award to the potential seller offering the lowest price for the sale of the designated quantity of the designated product.

3. The system according to claim 1, wherein said designated product is a specifically identified goods or service.

4. The system according to claim 1, wherein said designated product is any one of several specifically identified goods or services.

5. The system according to claim 1, wherein said designated product is identified by a specification.

6. The system according to claim 1, wherein said designated product is an option for a specifically identified goods or service.

7. The system according to claim 1, wherein said designated product is a group of specifically identified goods or services bundled together as a single product package.

8. The system according to claim 1, wherein said database server system is programmed to enable potential purchasers to use their respective user client devices within a specified time period to become members of a said purchasers group.

9. The system according to claim 1, wherein said database server system is programmed to enable potential sellers to use their respective supplier client devices within a specified time period to tender a said offer.

10. The system according to claim 1, wherein said database server system is programmed to enable a plurality of potential sellers to use their respective supplier client devices to tender a joint offer regarding the designated quantity of the designated product in a formulated bid request.

11. The system according to claim 1, wherein said database server system is programmed to enable potential purchasers to use their respective user client devices to become members of any one of a plurality of said purchasers groups.

12. The system according to claim 1, wherein each of said user client devices and supplier client devices is a computer, and said database server system is in communication therewith via the World Wide Web.

* * * * *

UNITED STATES PATENT AND TRADEMARK OFFICE
CERTIFICATE OF CORRECTION

PATENT NO.   : 6,876,983 B1
DATED        : April 5, 2005
INVENTOR(S)  : Opher Goddard et al.

It is certified that error appears in the above-identified patent and that said Letters Patent is hereby corrected as shown below:

<u>Title page,</u>
Item [76], Inventor: after the first named inventor, insert: -- Mordechai Abraham, 3 Cfar Truman, 73150 (IL) --.
Item [60], Related U.S. Application Data, insert before the Provisional application data: -- PCT application PCT/IL99/00650 filed December 1, 1999; --.

Signed and Sealed this

Sixteenth Day of August, 2005

JON W. DUDAS
*Director of the United States Patent and Trademark Office*